(12) United States Patent
Murphy

(10) Patent No.: US 8,484,027 B1
(45) Date of Patent: Jul. 9, 2013

(54) METHOD FOR LIVE REMOTE NARRATION OF A DIGITAL BOOK

(75) Inventor: William A. Murphy, Glace Bay (CA)

(73) Assignee: Skyreader Media Inc., Toronto (CA)

( * ) Notice: Subject to any disclaimer, the term of this patent is extended or adjusted under 35 U.S.C. 154(b) by 498 days.

(21) Appl. No.: 12/797,874

(22) Filed: Jun. 10, 2010

Related U.S. Application Data

(60) Provisional application No. 61/186,447, filed on Jun. 12, 2009, provisional application No. 61/186,460, filed on Jun. 12, 2009, provisional application No. 61/294,230, filed on Jan. 12, 2010.

(51) Int. Cl.
*G10L 13/00* (2006.01)

(52) U.S. Cl.
USPC ........ 704/258; 704/260; 704/270; 704/270.1; 704/272

(58) Field of Classification Search
USPC ................. 704/258, 260, 270, 270.1, 272
See application file for complete search history.

(56) References Cited

U.S. PATENT DOCUMENTS

| | | |
|---|---|---|
| 5,176,520 A | 1/1993 | Hamilton |
| 5,872,924 A | 2/1999 | Nakayama et al. |
| 5,996,002 A | 11/1999 | Katsurabayashi et al. |
| 6,141,000 A | 10/2000 | Martin |
| 6,154,214 A | 11/2000 | Uyehara et al. |
| 6,438,611 B1 | 8/2002 | Hara et al. |
| 6,632,094 B1 * | 10/2003 | Falcon et al. ............... 434/178 |
| 6,714,214 B1 | 3/2004 | DeMello et al. |
| 6,795,684 B2 | 9/2004 | Stuppy |
| 6,901,386 B1 | 5/2005 | Dedrick et al. |
| 7,020,663 B2 | 3/2006 | Hay et al. |
| 7,028,267 B1 | 4/2006 | Beezer et al. |
| 7,103,848 B2 | 9/2006 | Barsness et al. |
| 7,246,118 B2 | 7/2007 | Chastain et al. |
| 7,260,781 B2 | 8/2007 | DeMello et al. |
| 7,269,787 B2 | 9/2007 | Amitay et al. |
| 7,350,704 B2 | 4/2008 | Barsness et al. |
| 7,415,537 B1 * | 8/2008 | Maes ........................ 709/246 |
| 7,477,870 B2 | 1/2009 | Lane |
| 7,506,246 B2 | 3/2009 | Hollander et al. |
| 7,516,073 B2 | 4/2009 | Kodama |
| 7,562,397 B1 | 7/2009 | Mithal et al. |
| 7,594,187 B2 | 9/2009 | Baird et al. |

(Continued)

FOREIGN PATENT DOCUMENTS

WO WO2011049999 A1 4/2011

OTHER PUBLICATIONS

W3C, Synchronized Multimedia Integration Language, SMIL 2.0, pp. 1-16, 2005.
Lynn Leith, "DAISY Demystified", SCUN 2007, pp. 1-5, Dec. 2007.

*Primary Examiner* — Qi Han
(74) *Attorney, Agent, or Firm* — The Law Office of Michael E. Kondoudis

(57) ABSTRACT

A method for narrating a digital book includes retrievably storing first data relating to narration of the digital book by a first end-user. The first data is then provided to a user device having stored thereon the digital book. Subsequently, the digital book is presented in narrated form to a second end-user via the user device. In particular, the digital book is displayed via a display portion of the user device while simultaneously providing in audible form the first data via an audio output portion of the user device.

20 Claims, 10 Drawing Sheets

U.S. PATENT DOCUMENTS

| | | |
|---|---|---|
| 7,631,013 B2 | 12/2009 | Parsons et al. |
| 7,783,986 B2 | 8/2010 | Barsness et al. |
| 7,797,343 B2 | 9/2010 | Morain et al. |
| 7,865,817 B2 | 1/2011 | Ryan et al. |
| 7,877,460 B1 | 1/2011 | Brouwer et al. |
| 7,975,216 B2 | 7/2011 | Woolfe et al. |
| 8,073,695 B1 | 12/2011 | Hendricks et al. |
| 2001/0049648 A1 | 12/2001 | Naylor et al. |
| 2002/0026323 A1 | 2/2002 | Sakaguchi et al. |
| 2002/0099552 A1 | 7/2002 | Rubin et al. |
| 2002/0116420 A1 | 8/2002 | Allam et al. |
| 2002/0133464 A1 | 9/2002 | Ress et al. |
| 2002/0138591 A1 | 9/2002 | Reynolds et al. |
| 2002/0161844 A1 | 10/2002 | Overtoom |
| 2002/0165880 A1 | 11/2002 | Hornsby et al. |
| 2002/0184107 A1 | 12/2002 | Tsuda et al. |
| 2003/0009459 A1 | 1/2003 | Chastain et al. |
| 2003/0018663 A1 | 1/2003 | Cornette et al. |
| 2003/0046080 A1 | 3/2003 | Hejna, Jr. |
| 2003/0093275 A1 | 5/2003 | Polanyi et al. |
| 2003/0097636 A1 | 5/2003 | Cleveland |
| 2003/0100965 A1 | 5/2003 | Sitrick et al. |
| 2003/0110925 A1 | 6/2003 | Sitrick et al. |
| 2003/0110926 A1 | 6/2003 | Sitrick et al. |
| 2003/0117436 A1 | 6/2003 | Kautto-Koivula et al. |
| 2003/0144961 A1 | 7/2003 | Tharaken et al. |
| 2004/0003344 A1 | 1/2004 | Lai et al. |
| 2004/0139400 A1 | 7/2004 | Allam et al. |
| 2004/0193441 A1 | 9/2004 | Altieri |
| 2004/0268253 A1 | 12/2004 | DeMello et al. |
| 2005/0022113 A1* | 1/2005 | Hanlon .................. 715/511 |
| 2005/0027671 A1 | 2/2005 | Hind et al. |
| 2005/0027846 A1 | 2/2005 | Wolfe et al. |
| 2005/0042591 A1 | 2/2005 | Bloom et al. |
| 2005/0061873 A1 | 3/2005 | Pirillo |
| 2005/0114333 A1 | 5/2005 | Nagano |
| 2005/0151744 A1 | 7/2005 | Charkraborty |
| 2005/0193330 A1 | 9/2005 | Peters |
| 2005/0289459 A1* | 12/2005 | Walton .................. 715/526 |
| 2006/0053365 A1 | 3/2006 | Hollander et al. |
| 2006/0075354 A1 | 4/2006 | Harpel |
| 2006/0114757 A1 | 6/2006 | Theimer et al. |
| 2006/0161578 A1 | 7/2006 | Siegel et al. |
| 2006/0168507 A1 | 7/2006 | Hansen |
| 2006/0194181 A1 | 8/2006 | Rosenberg |
| 2007/0118556 A1 | 5/2007 | Arnold et al. |
| 2007/0201702 A1 | 8/2007 | Hendricks et al. |
| 2007/0255580 A1 | 11/2007 | Cole et al. |
| 2007/0267253 A1 | 11/2007 | Tauer |
| 2007/0292826 A1 | 12/2007 | Goddy et al. |
| 2007/0294422 A1 | 12/2007 | Zuckerman et al. |
| 2007/0298399 A1 | 12/2007 | Shao et al. |
| 2008/0005656 A1 | 1/2008 | Pang et al. |
| 2008/0077492 A1 | 3/2008 | Ho et al. |
| 2008/0082903 A1 | 4/2008 | McCurdy et al. |
| 2008/0140401 A1 | 6/2008 | Abrash et al. |
| 2008/0140412 A1 | 6/2008 | Millman et al. |
| 2008/0141182 A1 | 6/2008 | Barsness et al. |
| 2008/0145828 A1 | 6/2008 | Yu |
| 2008/0163039 A1 | 7/2008 | Ryan et al. |
| 2008/0168073 A1 | 7/2008 | Siegel et al. |
| 2008/0229182 A1 | 9/2008 | Hendricks et al. |
| 2008/0229190 A1 | 9/2008 | Johnson |
| 2009/0047647 A1 | 2/2009 | Welch |
| 2009/0055288 A1 | 2/2009 | Nassimi |
| 2009/0066722 A1 | 3/2009 | Kriger et al. |
| 2009/0106206 A1 | 4/2009 | Sherman |
| 2009/0177996 A1 | 7/2009 | Hunt et al. |
| 2009/0216623 A1 | 8/2009 | Hendricks et al. |
| 2009/0239202 A1 | 9/2009 | Stone |
| 2009/0260067 A1 | 10/2009 | Racabi |
| 2009/0317778 A1* | 12/2009 | Oberman ..................... 434/169 |
| 2010/0105016 A1 | 4/2010 | Margolis |
| 2010/0146115 A1 | 6/2010 | Bezos |
| 2010/0216108 A1 | 8/2010 | Cooperman et al. |
| 2010/0218098 A1 | 8/2010 | Sitrick et al. |
| 2010/0262515 A1 | 10/2010 | Brewer |
| 2010/0306122 A1 | 12/2010 | Shaffer |
| 2011/0078050 A1 | 3/2011 | Schwartz |
| 2011/0107239 A1 | 5/2011 | Adoni et al. |
| 2011/0191692 A1 | 8/2011 | Walsh et al. |
| 2011/0302009 A1 | 12/2011 | Freed et al. |

* cited by examiner

METHOD FOR LIVE REMOTE NARRATION OF A DIGITAL BOOK

This application claims the benefit of U.S. Provisional Application Nos. 61/186,447 and 61/186,460 filed on Jun. 12, 2009, the entire contents of both of which are incorporated herein by reference. This application also claims the benefit of U.S. Provisional Application No. 61/294,230 filed on Jan. 12, 2010, the entire contents of which are incorporated herein by reference.

FIELD OF THE INVENTION

The instant invention relates generally to digital books, and more particularly to a method for live remote narration of a digital book.

BACKGROUND OF THE INVENTION

A digital book, which is also known as an electronic book or an e-book, is the digital media equivalent of a conventional printed book. Conveniently, digital books may be read on personal computers, personal digital assistants (PDAs), smart phones, etc., or on dedicated hardware devices known as digital book readers, e-book readers or e-book devices, etc. Typically, digital books are structured as virtual frames presented on a display device. During a reading session a user may turn or change from one virtual frame or "page" to another. Advantageously, the "pages" are not fixed permanently, and may be redefined or repaginated based on variances in display conditions, such as screen size, font type or size, margins, line spacing, resolution, etc.

Digital books currently offer several advantages over conventional printed books. For instance: text can be searched automatically and cross-referenced using hyperlinks; font size and font type can be customized; non-permanent highlighting and annotation is supported; animated images or multimedia clips are supported; reading can resume automatically at the last read page, etc. In addition, a single e-book reader containing the text of several digital books is easier to carry around than the same books in printed form, and the backlit display of the e-book reader allows reading in low light or even in total darkness. Although they require electricity to be read, the production of digital books does not consume the paper, ink, and other resources that are used to produce printed books.

Another convenience that is associated with digital books is the ability to purchase and download, or download and store, a selection directly from a digital library or commercial site. Some e-book readers, such as for instance Amazon's Kindle 2, use a 3G wireless network to allow the user to download digital books directly to the device, even if a Wi-Fi hotspot is not available. Other devices that can be "repurposed" for reading digital books, such as for instance Apple's IPod Touch, achieve similar functionality using a local wireless network connection.

Since digital books are displayed using electronic devices, narration is made possible whereby the text of a digital book is presented to a user in audible form, such as for instance via integrated speakers of the electronic device or via external headphones. Narration requires the provision of soundtrack data, which is specific to each digital book. Conveniently, a young child may use a narrated digital book without full adult assistance, or an older user may choose to enjoy the relaxing experience of having the digital book read to them. Although the narration feature is convenient, different users may enjoy the experience to differing degrees since the narrator's voice may not appeal equally to all readers. In some instances, the narrator's voice may not seem to suit the content of the digital book. In addition, children may experience the feeling that the story is being read to them by a stranger. Other personal preferences may also affect the user's enjoyment of the narrated digital book.

In general, children prefer to hear a parent or grandparent or another familiar voice reading a story. Furthermore, children prefer to have the same story read to them in a different way each time it is read. Children tend to enjoy hearing different reading styles, different expressions, etc. Unfortunately, stored narrations of digital books provide a very static reading experience, and they are not easily adapted to suit a current preference of a child.

It would be advantageous to provide a method and system for narrating a digital book that overcomes at least some of the above-mentioned limitations.

SUMMARY OF EMBODIMENTS OF THE INVENTION

In accordance with an aspect of the invention there is provided a method for narrating a digital book, comprising: displaying the digital book to an end-user via a display portion of a first user device; during displaying of the digital book, receiving end-user soundtrack data via an audio input portion of the first user device, the end-user soundtrack data based on the end-user's spoken narration of the digital book; streaming the end-user soundtrack data from the first user device to a second user device via a communication network disposed therebetween; and, providing via the second user device the digital book in narrated form, comprising simultaneously displaying the digital book via the display portion of the second user device and providing in audible form the streamed end-user soundtrack data via an audio output portion of the second user device.

In accordance with the aspect of the instant invention, the display portion of the first user device comprises a touch-sensitive screen for displaying words of the digital book, and wherein the end-user touches displayed words during reading thereof for providing the indication of the pace of the end-user's spoken narration of the digital book.

In accordance with the aspect of the instant invention, the indication of the pace of the end-user's narration of the digital book is provided in dependence upon the end-user selecting the display of a next page of the digital book.

In accordance with the aspect of the instant invention, the end-user soundtrack data is streamed from the first user device to the second user device via the Internet.

In accordance with the aspect of the instant invention, the portable electronic device is repurposed for displaying digital books, and absent being repurposed the portable electronic device other than supports display of digital books.

In accordance with the aspect of the instant invention, the portable electronic device is a multiple-display device and the display portion comprises a first display element for displaying a first page of the digital book and a second display element for displaying a second other page of the digital book, so as to support simultaneous display of the first page and of the second other page.

In accordance with an aspect of the invention there is provided a method comprising: providing a first user device at a first location; providing a second user device comprising at least a speaker at a second other location; providing a first communication signal from one of the first user device and the second user device to the other of the first user device and the second user device via a wide area network, the first communication signal for initiating a first communication session between the first user device and the second user device; starting a first session on the first user device; starting on the second user device a first session associated with the first session on the first user device; displaying within the first session on the first user device and within the first session on the second user device a same digital book; controlling display of the same digital book to approximately synchronize display within each of the first sessions; sampling audio information with the first user device to provide audio data; transmitting the audio data via the network from the first user device to the second user device; and, playing the audio data on the at least a speaker of the second user device.

In accordance with the aspect of the instant invention, it is verified that the first user device and the second user device each have stored thereon a copy of the digital book.

In accordance with the aspect of the instant invention, profile information relating to the other one of the first user device and the second user device is stored on at least one of the first user device and the second user device, the profile information including data relating to a communication address for establishing the first session with the other one of the first user device and the second user device via the wide area network.

In accordance with the aspect of the instant invention, the audio data is stored for later retrieval.

BRIEF DESCRIPTION OF THE DRAWINGS

Exemplary embodiments of the invention will now be described in conjunction with the following drawings, in which:

FIG. 2b is a simplified side view of the repurposed electronic device of FIG. 2a;

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
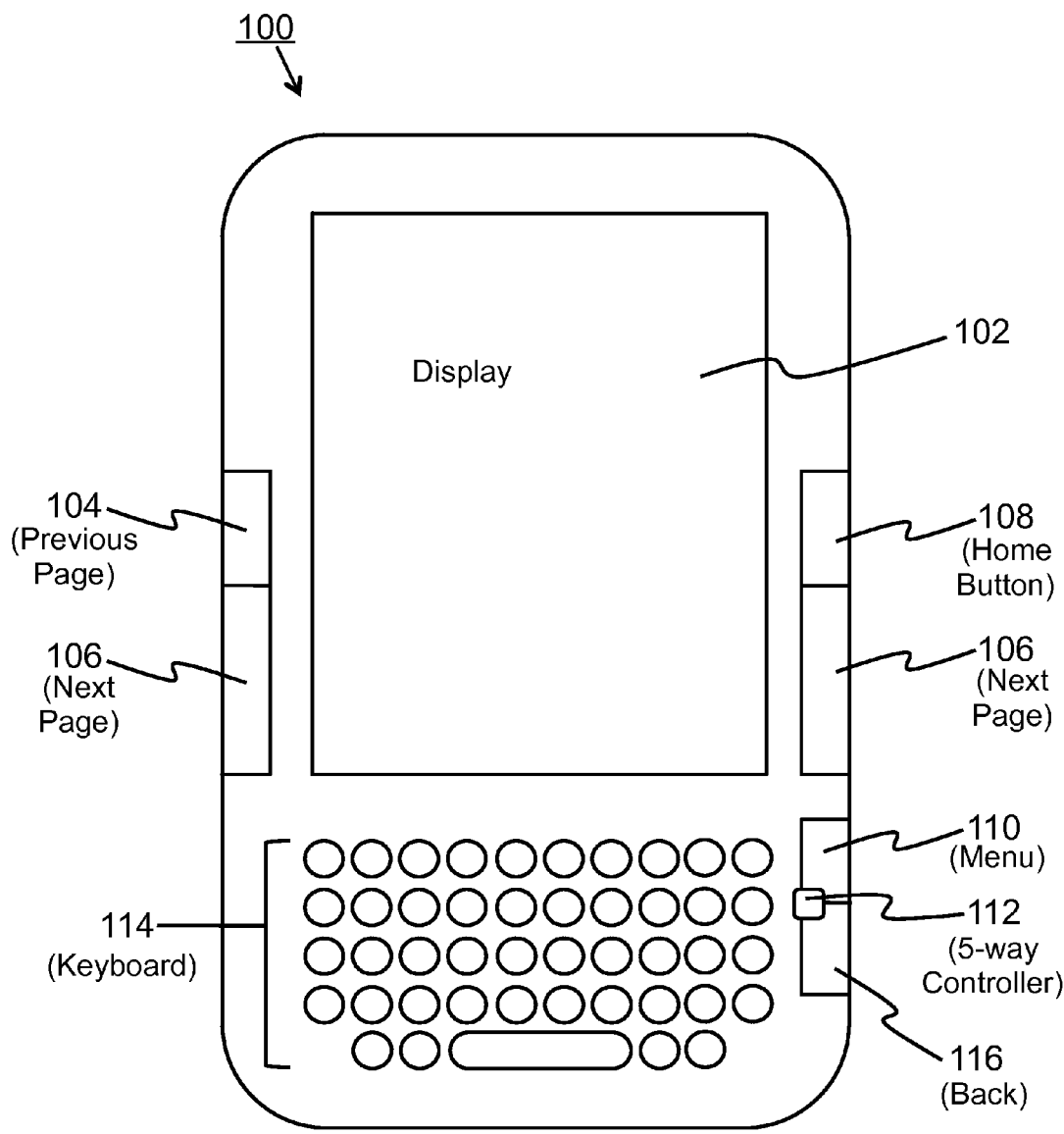
FIG. 1 is a simplified front view of a typical e-book reader according to the prior art.

Referring to FIG. 1, shown is a simplified front view of a typical e-book reader according to the prior art. The e-book reader 100 includes a display portion 102, such as for instance a liquid crystal display (LCD) screen or an electronic ink (E Ink®) display. During use, the content of a digital book is displayed one page at a time using the display portion 102. A user navigates the contents of the digital book using control buttons, such as for instance previous page button 104 and next page button 106. Home button 108 displays content that is stored on the e-book reader, or that is available to be downloaded to the e-book reader either from pre-purchased books, from an online catalogue of purchasable books, or from an online lending library of e-books. The menu button 110 displays application and navigation options relating to a currently viewed page. A five-way controller 112 is used to select items when pressed down, and to move an on-screen cursor up and down and side-to-side. In addition, a keyboard 114 is used to enter text including notes, search terms, universal resource locators (URLs) for Web sites, etc. Optionally, the keyboard 114 is a soft keyboard generated within display portion 102, which supports typing in different languages and other forms of application-dependent customization. Back button 116 retraces steps on the e-book reader in a fashion similar to the back button on a web browser. In addition, the e-book reader optionally includes a not illustrated communication port or slot, such as for instance a USB port or a SD or Micro SD card slot, for transferring and/or storing digital data. Optionally, not illustrated integrated speakers and/or a headphone port are provided. Further optionally, other not illustrated controls and indicators are provided, such as for instance a volume control, a brightness control, a battery charge indicator, etc. Further optionally, the e-book reader includes short-range wireless communication transceivers for supporting direct device-to-device communication.

The e-book reader 100, such as for instance Amazon's Kindle 2 e-book reader, is designed specifically for displaying digital books, and as such it provides functionality for enhancing a user's enjoyment of digital books. For instance, the e-book reader 100 supports electronic searching for user specified terms, provides a static dictionary tool for defining terms in the digital books, allows the user to "jot" notes as they read, etc. That being said, the e-book reader 100 is a single-purpose electronic device, which is purchased solely for use in reading digital books. Unfortunately, the cost of purchasing a single-purpose electronic device such as the e-book reader 100 may dissuade many users from embracing digital books as an alternative to conventional printed books.

Figure 2A:
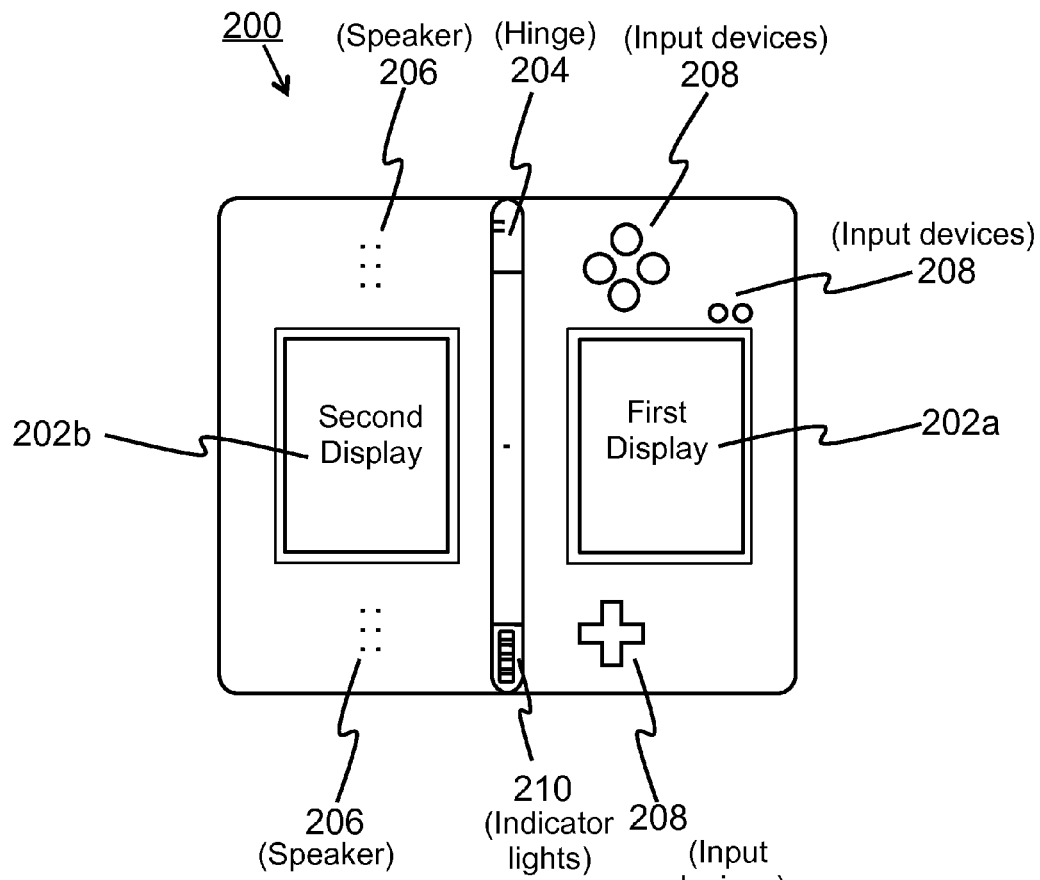
FIG. 2a is a simplified front view of a repurposed electronic device supporting the display of digital books, according to an embodiment of the instant invention.

Referring now to FIG. 2a, shown is a simplified front view of a "repurposed" electronic device supporting the display of digital books, according to an embodiment of the instant invention. By way of a specific and non-limiting example, the repurposed electronic device 200 is a Nintendo DS series game-playing unit, such as for instance a Nintendo DS, a Nintendo DS Lite or a Nintendo DSi. The device 200 includes a first display portion 202a and a second display portion 202b. The first display portion 202a is touch-sensitive. Optionally, the second display portion 202b is also touch-sensitive. The two display portions are hingedly connected via a hinge element 204, enabling the device 200 to be folded shut in a manner similar to that of a conventional printed book. Device 200 further includes stereo speakers 206, various control buttons and input devices 208, including a stylus, as well as status indicator lights 210.

Figure 2B:
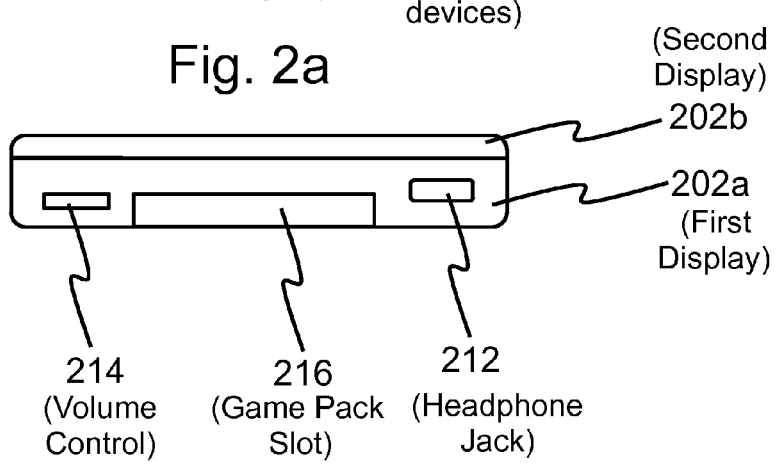

Referring now to FIG. 2b, shown is a simplified side view of the repurposed electronic device of FIG. 2a in a folded-shut condition. As is shown in FIG. 2b, the first display portion 202a faces the second display portion 202b when in the folded-shut condition. Thus, both display portions are protected from damage and the device 200 assumes "pocket friendly" dimensions. Also shown in FIG. 2b are headphone jack 212, volume control 214 and "game pack slot" 216. In particular, game pack slot 216 receives specially designed cartridges that have stored thereon computer readable code for providing various applications, such as for instance video game play.

The device 200 is a specific and non-limiting example of a multiple-display (multi-display) device comprising two separate display portions. Optionally, a multi-display device includes more than two separate display portions, such as for instance between three and eight separate display portions.

Embodiments of the instant invention will now be described in which the repurposed electronic device 200 is used by way of a specific and non-limiting example. However, the embodiments of the instant invention as described hereinbelow are equally applicable to the e-book reader 100 that was described with reference to FIG. 1, as well as to other similar single-purpose or "repurposed" electronic devices. In general, a "repurposed" device is adapted for displaying a digital book as a result of executing an appropriate software program. Such a software program is stored locally to the repurposed device, embodied on for instance a proprietary cartridge that is inserted into game pack slot 216, or is downloaded via a communications network and stored on an internal memory element of the repurposed device. Optionally, the software program is hard coded into the device, such as for instance by the manufacturer of the device. During use, the digital book is displayed via one or more display portions of the electronic device. In the case of device 200, opposite pages are optionally displayed side-by-side, one page being displayed on each of the two display portions 202a and 202b in a manner that is very similar to a conventional printed book. Optionally, the digital book is displayed using the two display portions 202a and 202b in landscape format. Further optionally, non-consecutive pages are displayed using the two display portions 202a and 202b. For instance, the first display portion 202a is used to display a page of text in the digital book and the second display portion is used to display the Table of Contents of the digital book.

Figure 3:
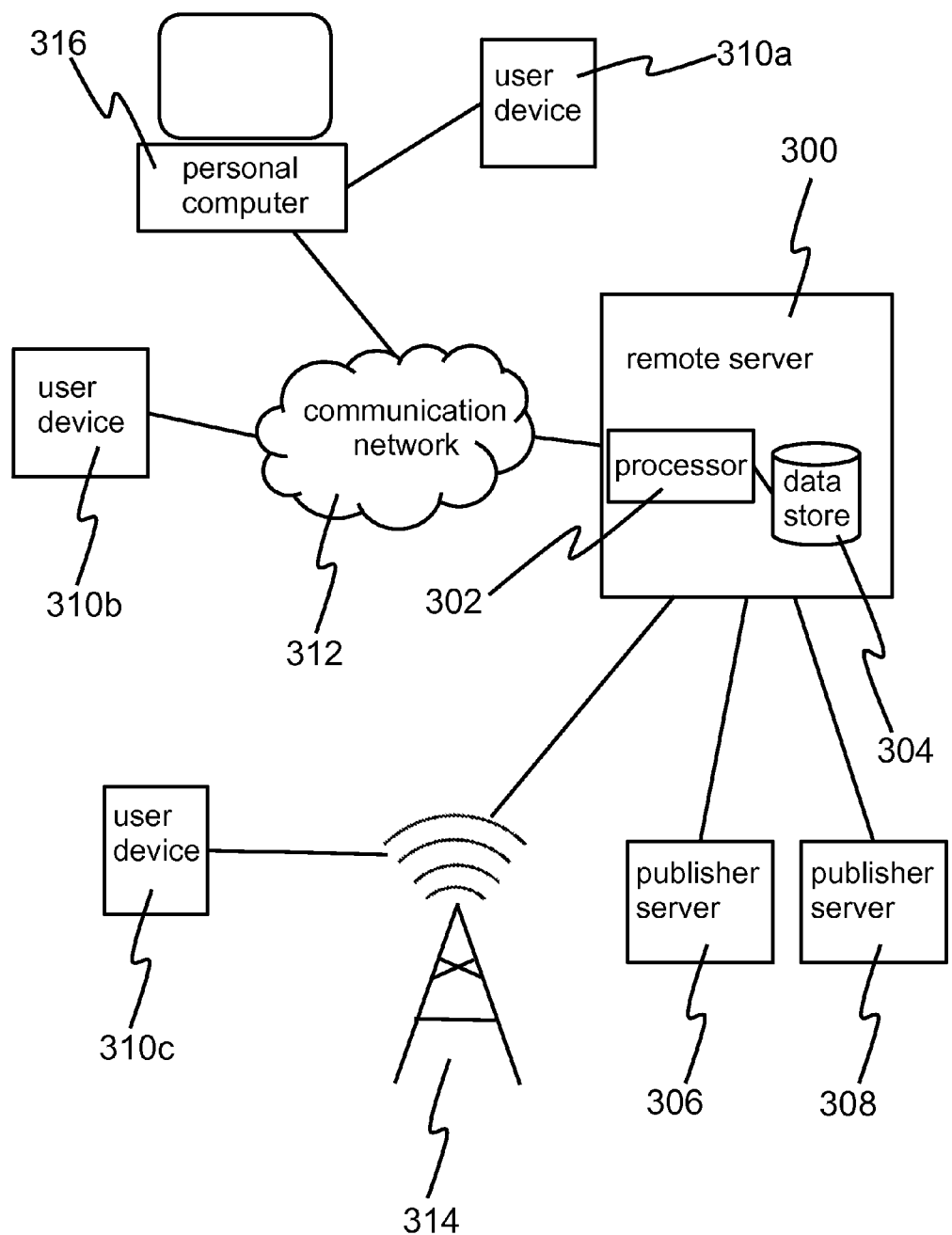
FIG. 3 is a simplified block diagram showing a system for providing narration of digital books, according to an embodiment of the instant invention.

Referring now to FIG. 3, shown is a simplified block diagram of a system for providing narration of digital books, according to an embodiment of the instant invention. The system includes a remote server 300, which further includes a processor 302 and a data storage device 304. Server 300 is in communication with external servers, such as for instance digital book publisher's servers 306 and 308. Server 300 is also in communication with a plurality of user devices 310a-c via a communications network, such as for instance the Internet 312 or a cellular network 314, or via WiFi or short-range radio or infra-red. The user devices optionally connect to the Internet 312 directly, as shown at 310b, or via a personal computer 316, as shown at 310a, or even via another mobile device such as another Nintendo DS series gaming unit. Each of the user devices 310a-c is, for instance, one of a repurposed electronic device 200, a single-purpose e-book reader 100, or another similar device. A detailed description of the infrastructure and protocols for the various communication networks that are shown in FIG. 3 is beyond the scope of this disclosure, and has been omitted for improved clarity since it is not essential for achieving an understanding of the embodiments of the instant invention.

Referring still to FIG. 3, a user device such as for instance the user device 310b connects to server 300, and provides a request thereto for the download of a digital book. Optionally, the request is to initiate streaming of the digital book to the user device 310b. In response to the request, server 300 provides the digital book to user device 310b via the communications network 312. When a digital book is downloaded from server 300, it is subsequently stored on a memory portion of user device 310b, making it available to be read by an end-user of user device 310b even when the user device is not connected to server 300 via communications network 312.

Figure 4:
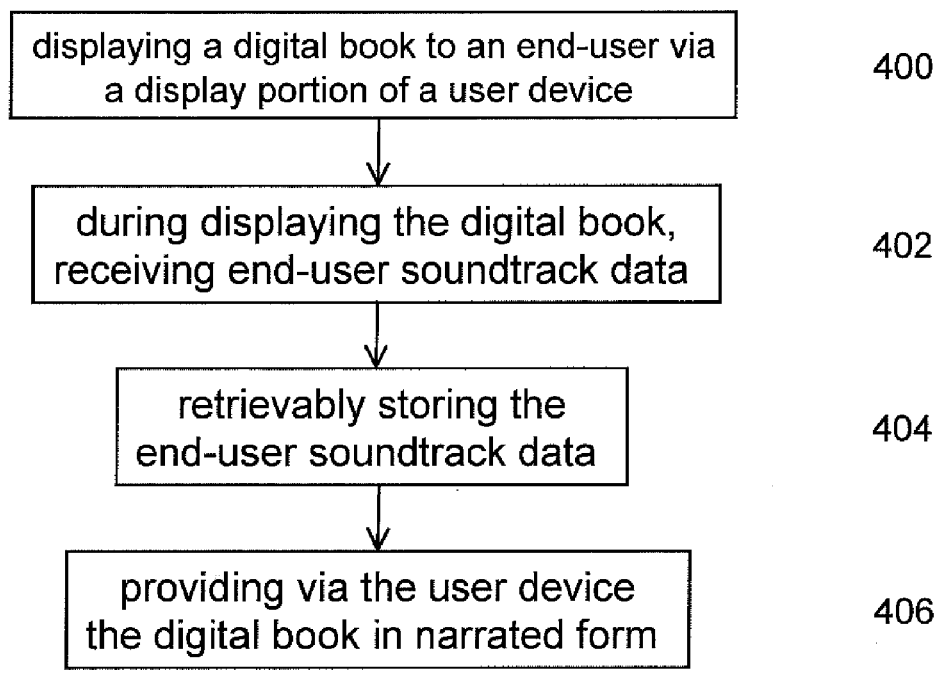
FIG. 4 is a simplified flow diagram of a method according to an embodiment of the instant invention.

Referring now to FIG. 4, shown is a simplified flow diagram of a method for narrating a digital book according to an embodiment of the instant invention. At 400 the digital book is displayed to an end-user via a display portion of a user device. For instance, the end-user is an adult and more particularly the end-user is the parent of a second other end-user. By way of a specific and non-limiting example, the user device is a portable electronic device, such as for instance one of the repurposed electronic device 200, the single-purpose electronic device 100 or another suitable device. At 402, during displaying the digital book, the end-user reads the digital book so as to provide spoken narration of the digital book. Using an audio input portion of the user device, end-user soundtrack data is received, the end-user soundtrack data based on the end-user's spoken narration of the digital book. At 404 the end-user soundtrack data is retrievably stored on a memory portion of the user device, so as to define an end-user soundtrack of the digital book. At 406 the digital book is provided in narrated form via the user device. In particular, step 406 comprises simultaneously displaying the digital book via the display portion of the user device and providing in audible form the end-user soundtrack via an audio output portion of the user device. Optionally, the audio output portion of the user device is one of integrated speakers of the user device or external headphones in operative communication with the user device. Similarly, the audio input portion of the user device is optionally one of an integrated microphone or an external microphone in operative communication with the user device.

Different end-users have different speech characteristics and accordingly the pace of the end-user's spoken narration is expected to vary from one end-user to another. For this reason, the end-user soundtrack data is stored in association with other data, the other data relating to a pace of the end-user's spoken narration of the digital book. Optionally, the viewer of the digital book has a mechanism to adjust a speed of narration playback. The other data is then used for synchronizing the simultaneous display of the digital book and the providing of the end-user soundtrack. For instance, the other data is synchronization data determined in dependence upon indications that are provided by the end-user during the course of the end-user's spoken narration of the digital book. By way of a specific and non-limiting example, the text of the digital book is displayed using a touch sensitive display of the user device at step 400 and the end-user touches a displayed word at the time the displayed word is being read at step 402 for providing the indications. Of course, it is not necessary for the end-user to touch every word, since for instance the first word of every paragraph or the first and last word of every page may be touched in order to provide sufficient synchronization data for advancing the display of the digital book in step with the end-user narration. Optionally, the end-user provides the indications each time display of a next page of the digital book is selected during step 402. Further optionally, synchronization data is determined by matching the end-user narration with the text of the digital book using a speech recognition algorithm.

Optionally, the display of the digital book is controlled in a manual fashion during step 406 and the synchronization data is used to pause playback of the end-user soundtrack at the end of each page being narrated, or at the end of every second page being narrated in the case of a dual display device. Further optionally, the end-user soundtrack data is stored as a plurality of sub-soundtracks, each sub-soundtrack being stored in association with an index to a different portion of the digital book, such as for instance a different page of the digital book. Thus, during step 406 when the display of the digital book advances from one page to a next page, the appropriate sub-soundtrack for the next page is retrieved automatically and is played back.

In the specific and non-limiting example that is presented with reference to FIG. 4, a parent records a customized digital book soundtrack for their child. The customized soundtrack enables the child to hear the story being read in their parent's voice, even when the parent is absent. Accordingly, prior to leaving for a trip a parent may choose to record a customized digital book soundtrack that is to be used by the child while they are away.

Figure 5:
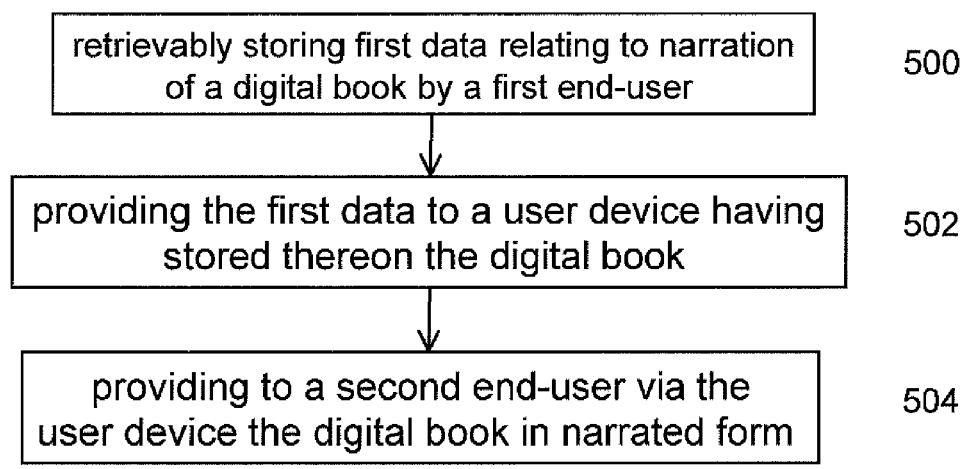
FIG. 5 is a simplified flow diagram of a method according to an embodiment of the instant invention.

Referring now to FIG. 5, shown is a simplified flow diagram of a method for narrating a digital book, according to an embodiment of the instant invention. At 500 first data relating to a first end-user's narration of the digital book by is retrievably stored. For instance, the first end-user is an adult and more particularly the end-user is the parent of a second end-user. In particular, the first-end user reads the digital book during display thereof via a display portion of a first system, so as to provide spoken narration of the digital book. Using an audio input portion of the first system, end-user soundtrack data is received, which is based on the first end-user's spoken narration of the digital book. At 502 the first data is provided to a user device, such as for instance user device 310b in FIG. 3, having stored thereon the digital book. Optionally, the first data is provided from the first system to the user device 310b via a wired or wireless communications channel, or via a physical storage medium such as for instance an optical or magnetic disk, a flash memory card, or a proprietary cartridge, etc. In a particular implementation, the first data is provided from the first system to the user device 310b via the Internet. At 504 the digital book in narrated form is provided to the second end-user via the user device 310b. In particular, step 504 comprises simultaneously displaying the digital book via a display portion of the user device 310b and providing in audible form the first data via an audio output portion of the user device 310b. Optionally, the audio output portion of the user device is one of integrated speakers of the user device or external headphones in operative communication with the user device.

In one implementation of the method of FIG. 5 the first system is a portable electronic device such as for instance user device 310a or 310c in FIG. 3. More particularly, the portable electronic device is one of the repurposed electronic device 200 and the single-purpose electronic device 100. In this implementation the first end-user records the spoken narration of the digital book via a microphone of the portable electronic device.

In another implementation of the method of FIG. 5 the first system is a personal computer system, such as for instance personal computer 316 in FIG. 3. In this other implementation, the first end-user records the spoken narration of the digital book via a microphone of the personal computer. For instance, the first end-user uses the personal computer to display a web page of the World Wide Web. Optionally, the first end-user logs into a personal account via the displayed web page, in order to gain access to a tool kit and/or other utilities that support the recording and synchronization of custom narration soundtracks for digital books. Optionally, the toolkit and/or other utilities also support insertion and synchronization of sound effects or "mood content," such as for instance race car sounds, creaking stairs, thunderstorm sounds, wind, background chatter or music, etc. Further optionally, the toolkit and/or other utilities also support insertion/changes and synchronization of visual effects, images or animations within the digital book. Optionally, basic and professional levels of the toolkits and/or other utilities are offered. The basic level is sufficient to allow a relative or a friend of an end-user to record a custom narration soundtrack either prior to or during an absence. On the other hand, the professional level supports more advanced editing, synchronization and mixing features, and is intended for use by a content company, a book author/illustrator, or an individual interested in selling their voice narrations on a commercial basis. Optionally, the toolkit and/or other utilities support re-use of classic book stories and images that are in the public domain, or copyrighted material with permission, such that new authors "sample" older books and images and re-interpret the older work in a manner similar to that which is currently done in the music industry. Optionally, narration soundtracks that are created using the web-based toolkit and/or other utilities are uploaded to server 300. The creator of a narration soundtrack may specify limits on how it is to be distributed, or they may allow free access. Optionally, the narration soundtrack is provided to a user device directly from the personal computer via wired or wireless communication. For instance, the narration soundtrack is streamed from the personal computer to the user device, so as to provide a live remote reading session in which the first end-user interacts in real time with the intended listener. Further optionally, the narration soundtrack is transferred from the personal computer to a user device via a physical storage medium such as for instance one of a USB flash drive, a SD card or a micro SD card, etc.

In the specific and non-limiting example that is presented with reference to FIG. 5, a parent records a customized digital book soundtrack for their child. The customized soundtrack enables the child to hear the story being read in their parent's voice, even when the parent is absent. Accordingly, prior to leaving for a trip a parent may choose to record a customized digital book soundtrack that is to be used by the child while they are away. Furthermore, the parent may record a customized digital book soundtrack at any time, even while they are absent, and provide the soundtrack to the child's user device via the Internet or another suitable communications network. Accordingly, the parent may "take requests" during their absence and provide customized soundtracks for their child via the communications network.

Figure 6:
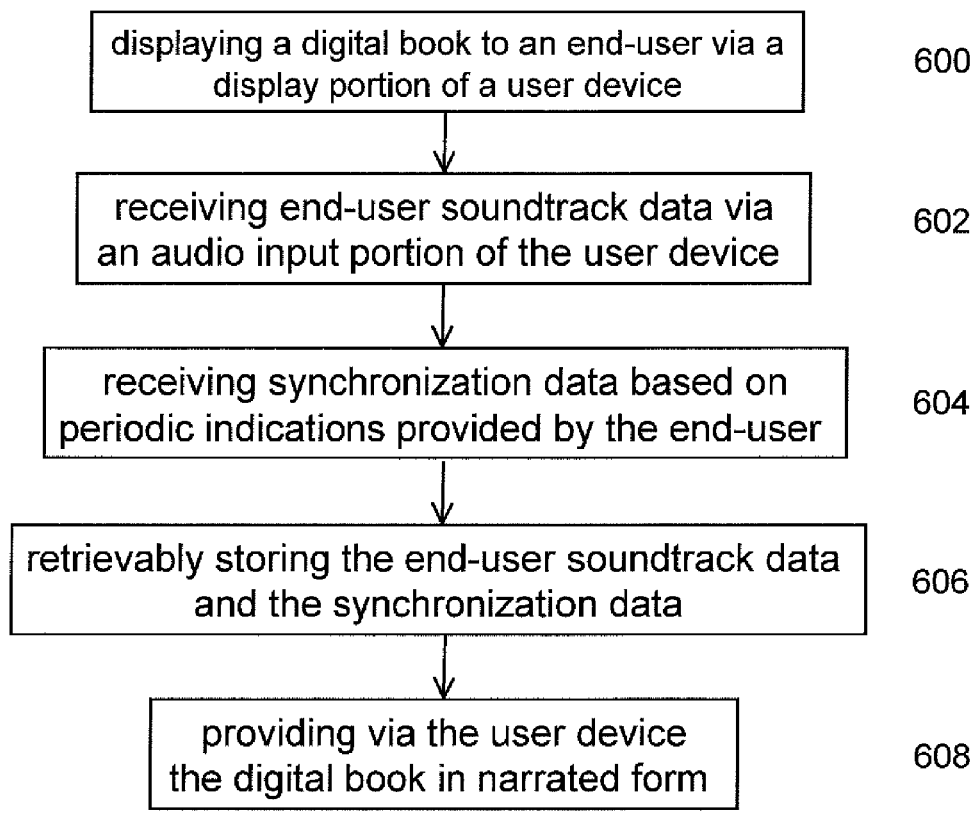
FIG. 6 is a simplified flow diagram of a method according to an embodiment of the instant invention.

Referring now to FIG. 6, shown is a simplified flow diagram of a method for narrating a digital book, according to an embodiment of the instant invention. At 600 the digital book is displayed to an end-user via a display portion of a user device. For instance, the end-user is an adult and more particularly the end-user is the parent of a second other end-user. By way of a specific and non-limiting example, the user device is a portable electronic device, such as for instance one of the repurposed electronic device 200, the single-purpose electronic device 100 or another suitable device. At 602, during displaying the digital book, end-user soundtrack data is received via an audio input portion of the user device, the end-user soundtrack data based on the end-user's spoken narration of the digital book. At 604, during displaying the digital book, synchronization data is received based on periodic indications provided by the end-user in dependence upon the end-user's narration pace. At 606 the end-user soundtrack data are retrievably stored in association with the synchronization data, so as to define an end-user soundtrack of the digital book. For instance, the soundtrack data and the synchronization data are retrievably stored on a memory portion of the user device. At 608 the digital book in narrated form is provided via the user device. Step 608 comprises synchronizing based on the synchronization data a visual display of the digital book via the display portion of the user device and an audio playback of the end-user soundtrack via an audio output portion of the user device.

In practice, steps 602 and 604 are performed simultaneously. For instance, the text of the digital book is displayed on a touch sensitive display of the user device, and the end-user touches the displayed words during reading thereof for providing the synchronization data. Of course, it is not necessary for the end-user to touch every word, since for instance the first word of every paragraph or the first and last word of every page may be touched in order to provide sufficient synchronization data for advancing the display of the digital book in step with the end-user narration. Alternatively, the end-user reads an entire page of the digital book without providing any indications, and only when the end-user selects display of a next page is an indication is provided. In this way, an end-of-page indicator is created for every page. Thus, during playback in step 608 a page of the digital book is displayed and a portion of the end-user soundtrack is provided in audible form. When the end-of-page indicator for that page is encountered, optionally the end-user soundtrack playback is paused or the digital book display is advanced automatically to the next page of the digital book.

Of course, the parent/child example that is discussed with reference to FIGS. 4-6 is intended to be merely illustrative and is not intended to be limiting in any way. In general, any first user may record a customized digital book soundtrack for being provided to any second user. Optionally, the customized digital book soundtrack includes copyright control information for preventing playback of the customized digital book soundtrack via any user device that is not authorized to display a legal copy of the digital book. According to at least some embodiments of the instant invention, customized digital book soundtracks are uploaded or otherwise provided to a broker system. The broker system then makes the customized soundtracks available, either for free or for a fee, to other users.

Figure 7A:
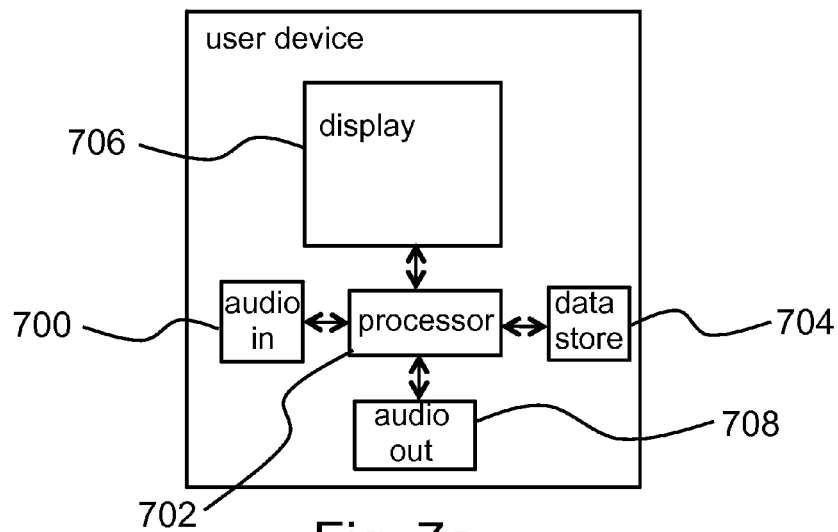
FIG. 7a is a simplified block diagram showing the components of a first system according to an embodiment of the instant invention.
Figure 7B:
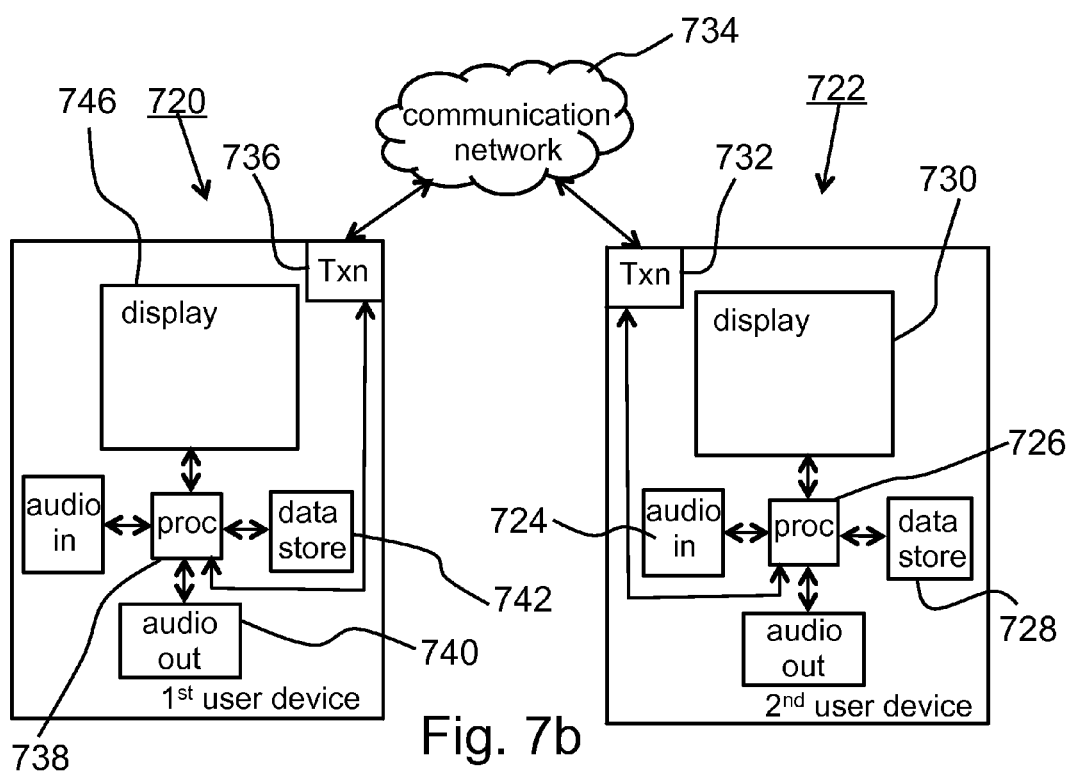
FIG. 7b is a simplified block diagram showing the components of a second system according to an embodiment of the instant invention.
Figure 7C:
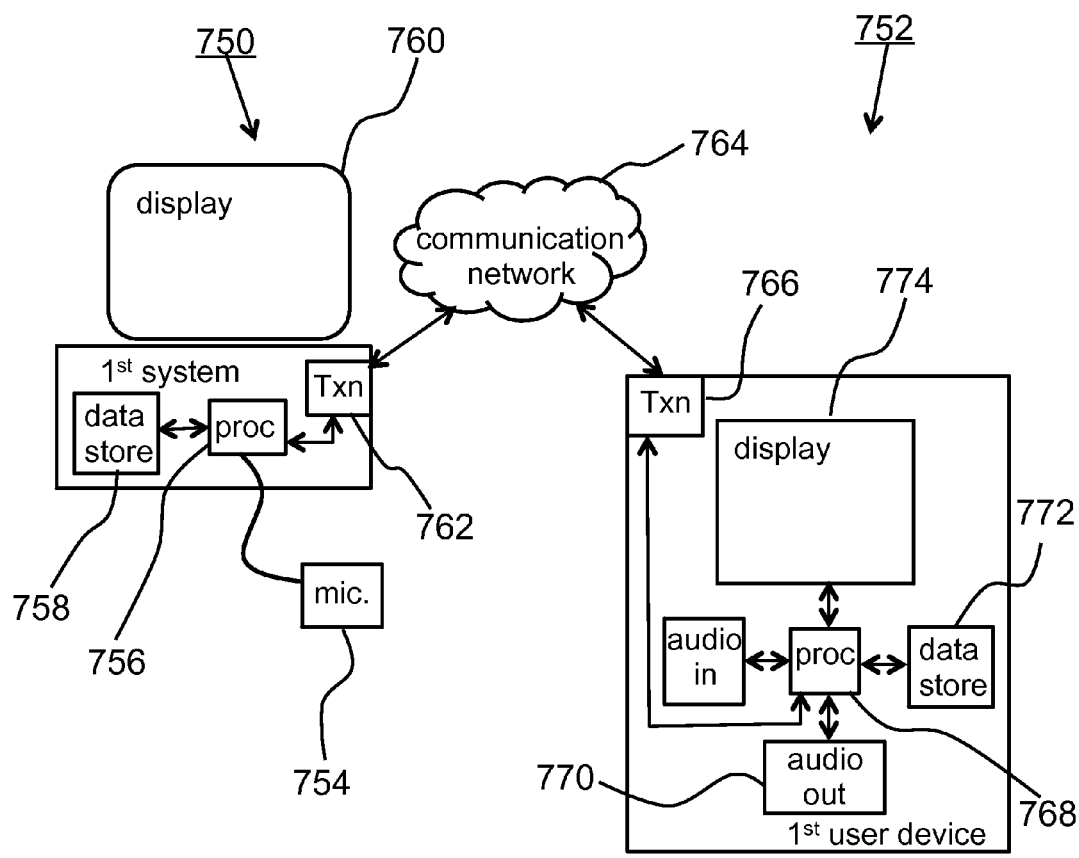
FIG. 7c is a simplified block diagram showing the components of a third system according to an embodiment of the instant invention; and, FIG. 8 is a simplified flow diagram of a method according to an embodiment of the instant invention.

FIGS. 7a-c show details of different systems suitable for implementing at least some of the methods described above with reference to FIGS. 4-6.

Referring specifically to FIG. 7a, all of the components of the system are embodied in a single user device, such as for instance a portable electronic device of the type that is shown generally at 100 in FIG. 1 or of the type that is shown generally at 200 in FIG. 2. In particular, the single user device includes an audio input portion or audio receiver, such as for instance integrated microphone 700. The microphone 700 senses an end-user's spoken narration of a digital book and provides to processor 702 a signal relating to the narration. Processor 702 transforms the signal into narration soundtrack data, and provides the narration soundtrack data for storage on storage device 704. A display device 706 displays the digital book based on data that is provided thereto from processor 702. Similarly, an audio output device, such as for instance integrated stereo speakers 708, provides in audible form the narration soundtrack based on a signal provided thereto from processor 702. The system of FIG. 7a is suitable for use with the methods described with reference to FIGS. 4 and 6.

Referring specifically to FIG. 7b, a first user device 720 and a second user device 722 are shown. For instance, the first user device 720 and the second user device 722 are portable electronic devices of the type that is shown generally at 100 in FIG. 1 or of the type that is shown generally at 200 in FIG. 2. According to FIG. 7b, a first end-user's spoken narration of a digital book is sensed using an audio input portion or audio receiver, such as for instance integrated microphone 724 of second user device 722. The microphone 724 provides to processor 726 a signal relating to the narration. Processor 726 transforms the signal into narration soundtrack data, and provides the narration soundtrack data for storage on storage device 728. Display portion 730 is used for displaying the digital book during narration thereof by the first end-user. The narration soundtrack data is also provided from processor 726 to the first user device 700, via a pathway including transducer 732, communications network 734, and transducer 736. For instance, the soundtrack data is streamed via the pathway from the second user device 722 to the first user device 720 to provide a live remote-reading session. Processor 738 of the first user device 700 provides the received narration soundtrack data to audio output device 740, and also stores the narration soundtrack data on storage device 742. Accordingly, during use, the narration soundtrack is provided in audible form to a first user via the audio output device 740, whilst the digital book is displayed to the first user via display 746. The system of FIG. 7b is suitable for use with the method described with reference to FIG. 5.

The second user device 722 and the first user device 720 must be in communication one with the other when the system of FIG. 7b is being used to stream the soundtrack data via the pathway from the second user device 722 to the first user device 720. During a live remote-reading session, the first end-user narrates the digital book as it is being displayed via second user device 722, whilst the first user views the digital book and listens to the streamed narration soundtrack via first user device 720. The first-end user initiates page turns, etc. using the second user device 722, and control signals are transmitted to the first user device 720 to initiate page turns etc. approximately in synchronization with the second user device. Thus, the first end-user not only provides narration but also controls the display of the digital book on the first user device 720, in a fashion that approximates a reader reading a physical book to a listener. Of course, each live remote-reading session is a unique reading experience for the first user, since the first end-user will read at a different speed or using different expressions during each session. Since the first end-user optionally controls the display of the digital book on the first user device 720, the first end-user may provide additional commentary etc. in addition to merely reading the text of the digital book.

Optionally, the processor 726 transforms the signal into narration soundtrack data, and provides the narration soundtrack data via a communications network for storage on a not illustrated remote storage device. For instance, the narration soundtrack data is stored on a storage portion of a remote server that is connected to the Internet, such that the first user device, or any other user device that is authorized, may request the stored narration soundtrack data from the remote storage device. For instance, a parent may store a plurality of different soundtracks on the remote storage device, and thereafter a child or another individual may select a desired soundtrack from the plurality of soundtracks. According to this implementation, the stored soundtracks are accessible by multiple users from multiple devices, and "favorite" soundtracks may be requested multiple times. In particular, a user may delete soundtracks that are not currently being used from the internal memory of the user device, in order to free up memory for the storage of new data. When the deleted soundtracks are required at a later time, the user simply requests the soundtracks from the remote storage device.

Referring specifically to FIG. 7c, a first system 750 and a first user device 752 are shown. For instance, the first system 750 is the personal computer 316 in FIG. 3 and the first user device 752 is a portable electronic device of the type that is shown generally at 100 in FIG. 1 or of the type that is shown generally at 200 in FIG. 2. According to FIG. 7c, a first end-user's spoken narration of a digital book is sensed using an audio input portion or audio receiver, such as for instance external microphone 754 of the first system 750. The microphone 754 provides to processor 756 a signal relating to the narration. Processor 756 transforms the signal into narration soundtrack data, and provides the narration soundtrack data for storage on storage device 758. Display portion is 760 used for displaying the digital book during narration thereof by the first user. The narration soundtrack data is also provided from processor 756 to the first user device 752, via a pathway including transducer 762, communications network 764, and transducer 766. Processor 768 of the first user device 752 provides the received narration soundtrack data to audio output device 770, and also stores the narration soundtrack data on storage device 772. During use, the narration soundtrack is provided in audible form to a first user via the audio output device 770, whilst the digital book is displayed to the first user via display 774. The system of FIG. 7c is suitable for use with the method described with reference to FIG. 5.

Optionally, the processor 756 transforms the signal into narration soundtrack data, and provides the narration soundtrack data via a communications network for storage on a not illustrated remote storage device. For instance, the narration soundtrack data is stored on a storage portion of a remote server that is connected to the Internet, such that the first user device, or any other user device that is authorized, may request the stored narration soundtrack data from the remote storage device. For instance, a parent may store a plurality of different soundtracks on the remote storage device, and thereafter a child or another individual may select a desired soundtrack from the plurality of soundtracks. According to this implementation, the stored soundtracks are accessible by multiple users from multiple devices, and "favorite" soundtracks may be requested multiple times. In particular, a user may delete soundtracks that are not currently being used from the internal memory of the user device, in order to free up memory for the storage of new data. When the deleted soundtracks are required at a later time, the user simply requests the soundtracks from the remote storage device.

For Example, a user records a narration soundtrack and associates that soundtrack with other known users allowing them access to the soundtrack. This is accomplished by manually relating users. Alternatively, a user preference allows for selection of different predetermined groups of users that the user has previously provided. Further alternatively, a social networking structure is employed for determining related users that are permitted access to a narration file.

Of course, it would be advantageous to inform the user when another user has played the narration soundtrack. For example, a grandparent who narrates a book for their grandchild would be pleased to know the grandchild has listened to the narration. When informed promptly, the grandparent is afforded an opportunity to communicate with their grandchild soon after the narration is played. Often this has benefits. Of course, a grandparent may have several grandchildren and may receive several such notifications during the course of a few weeks allowing the grandparent/grandchild bond to be enhanced even when the two live far apart.

In yet another embodiment, when the narration soundtrack has completed playback, a communication path is established automatically between the listener and the user who recorded the narration soundtrack.

In the specific and non-limiting example that has been presented above with reference to FIGS. 3-7, a first user such as for instance a parent records a narration soundtrack for being provided to a second user such as for instance their child. In addition, the converse is also envisaged. For instance, during the parent's absence the child generates a narration soundtrack using one of the methods according to the instant invention. The child optionally touches every word as it is being read, for providing synchronization data, or the follows highlighted text. During playback of the narration soundtrack using a device having the digital book installed thereon, the parent may review the child's reading of the book. In particular, when the child has touched every word during reading thereof, each word is highlighted during playback. Accordingly, the parent may hear each word that is being spoken by the child and view the child's progress as the text is highlighted. Optionally, the parent touches a word during playback and records a corrected reading of the word, or of an entire portion of the book. Further optionally, a parent touching a word hears the child's reading of that word allowing for review in case some pronunciation is difficult to clearly hear.

Figure 8:
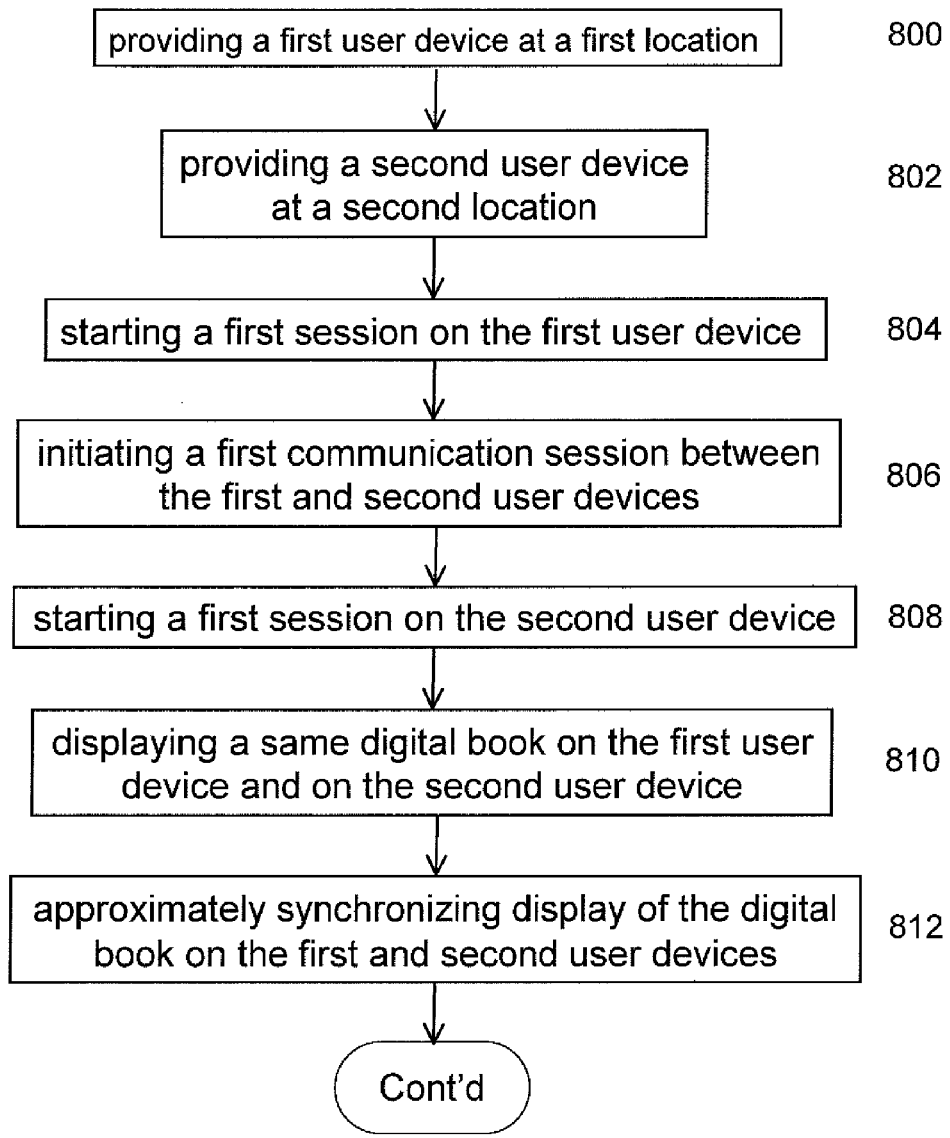
Figure 8:
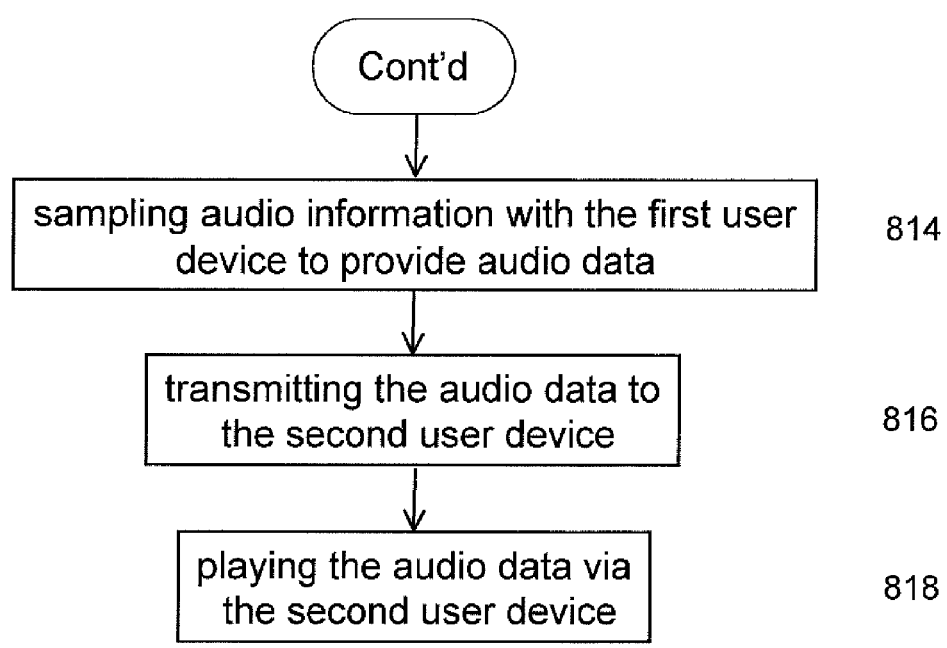

Referring to FIG. 8, shown is a method according to an embodiment of the instant invention. At 800 a first user device is provided at a first location. At 802 a second user device is provided at a second other location, the second other user device comprising at least a speaker. At 804 a first session is started on the first user device, and at 806 a first communication signal is provided from the first user device to the second user device via a wide area network, the first communication signal for initiating a first communication session between the first user device and the second user device. At 808 a first session, associated with the first session on the first user device, is started on the second user device. At 810 a same digital book is displayed within the first session on the first user device and within the first session on the second user device. Optionally, the digital book is stored on both the first and second user devices prior to the start of the first communication session. For instance, the digital book is downloaded to both the first and second user device via a wide area network, such as for instance the Internet. Optionally, a presence of the digital book on both the first user device and the second user device is verified prior to starting the first communication session. Alternatively, the digital book is stored on only one or the other of the first and second user devices prior to the start of the first communication session. In this case, the digital book is optionally deleted from the other one of the first and second user devices at the end of the first communication session.

Referring still to FIG. 8, at 812 the display of the same digital book on each of the first and second user devices is controlled to approximately synchronize display within each of the first sessions. In other words, the first user device and the second user device display substantially same portions of the digital book during substantially the same periods of time. For instance, information relating to a change of the display of the digital book on the first user device are transmitted to the second user device and used to update the display of the digital book on the second user device. At 814, audio information is sampled with the first user device to provide audio data. At 816 the audio data are transmitted via the network from the first user device to the second user device. At 818 the audio data are played on the at least a speaker of the second user device. In a specific and non-limiting example, the audio information is sampled as a user of the first user device reads the digital book out loud, and the audio data is streamed live from the first user device to the second user device, via a wide area network such as for instance the Internet. Since the audio data is streamed live during each first communication session, the narration of the digital book that is provided on the second user device is different every time the digital book is read. In particular, the user of the first user device may use different expressions, introduce sound effects and provide unique voices for different characters, make mistakes or skip words in the text of the digital book, thereby providing a more interesting reading experience and encouraging multiple reading sessions with the same digital book. Optionally, the audio data are transmitted via the network from the first user device to at least a third user device, in addition to the second user device. As such, a user at a first location may stream live narration of a digital book simultaneously to a plurality of other user devices, which are either co-located at a same second other location or are located at a plurality of other locations that are remote from the first location. For instance, a grandparent in a first city may narrate a digital book simultaneously for a plurality of different grandchildren located in a plurality of different other cities, etc.

In accordance with an embodiment of the instant invention, reader profile information is stored on the first user device relating to the second user device for communication therewith. For instance, the reader profile information comprises data relating to a communication address for establishing an audio communication link therewith. Thus, the grandparent, for example, merely selects the grandchild to whom they want to read and the device automatically establishes communication with the grandchild's device.

Though the above-described embodiment relates to streaming of audio data from a source to one or more destinations, it is also contemplated that the audio data is transmitted bi-directionally or multi-directionally allowing for a bedtime reading experience such as, for example, the grandparent would have if they were with their grandchild. In this way, the child can ask or answer questions, request a different story, sing, laugh, etc. and the reader can hear these responses and optionally respond to them. Similarly, with three or more participants, the audio data is optionally one directional, bi-directional, or in conference mode where all participants can hear all other participants.

In accordance with an aspect of the instant invention, data is exchanged between the first user device and the second user device for use in determining digital books that are supported by both user devices. For instance, depending upon the specific digital rights management that is attached to a specific digital book or alternatively to the digital book reader, some digital books must be stored on both the first and second user device to support remote reading, while other digital books may only need to be stored on either of the first and second user devices. When the digital book is required to be stored on only one of the first and second user devices, then optionally the digital book may be stored on the recipient device or the digital book may be stored on the initiator user device. For instance, if the digital book is required to be stored on only the initiator user device, then the one of the first and second user device upon which the digital book is stored must initiate the first communication session.

In an alternative embodiment, a digital book is, during playback, overlayed with digital track data having content other than the content of the digital book. Digital track data optionally includes animation data, video data, soundtrack data, sound effect data, voice over data, control data, and so forth. Thus, by providing a digital book and digital track data, it is possible to enhance a digital book reading experience. The digital rights management issues that relate to digital books being read from remote locations and synchronization thereof applies to digital track data as well. Thus, digital track data is preferably synchronized within the first sessions. Also, digital track data is optionally required to be present on both the first user device and the second user device in order to be overlayed and synchronized. Alternatively, the digital track data is only required to be present on one of the first and second devices.

Numerous other embodiments may be envisaged without departing from the scope of the invention.

What is claimed is:

1. A method for narrating a digital book, comprising:
   displaying the digital book to an end-user via a display portion of a first user device;
   during displaying of the digital book, receiving end-user soundtrack data via an audio input portion of the first user device, the end-user soundtrack data based on spoken narration of the digital book by the end-user;
   streaming the end-user soundtrack data from the first user device to a second user device via a communication network disposed therebetween; and,
   providing via the second user device the digital book in narrated form, comprising simultaneously displaying the digital book via the display portion of the second user device and providing in audible form the streamed end-user soundtrack data via an audio output portion of the second user device.

2. A method according to claim 1, wherein the end-user provides synchronization data for use in synchronizing the end-user soundtrack data with the display of the digital book on the second user device.

3. A method according to claim 2, wherein the synchronization data comprises an indication of transitioning from a current page to a next page of the digital book.

4. A method according to claim 2, comprising receiving from the end-user an indication of the pace of the spoken narration by the end-user of the digital book, wherein the synchronization data is determined in dependence upon the received indication.

5. A method according to claim 1, wherein the end-user soundtrack data is streamed from the first user device to the second user device via a wide area network.

6. A method according to claim 1, wherein at least one of the first user device and the second user device is a portable electronic device.

7. A method comprising:
   providing a first user device at a first location;
   providing a second user device comprising at least a speaker at a second other location;
   providing a communication signal from one of the first user device and the second user device to the other of the first user device and the second user device via a wide area network, the communication signal for initiating a communication session between the first user device and the second user device;

starting the communication session on the first user device;
starting the communication session on the second user device;
displaying, within the communication session, a digital book on the first user device and displaying, within the communication session, the digital book on the second user device;
controlling the displaying of the digital book, to approximately synchronize within the communication session the displaying of the digital book on each of the first user device and the second user device;
sampling audio information using the first user device, to provide audio data relating to the digital book;
transmitting the audio data via the network from the first user device to the second user device; and,
playing the audio data in human intelligible form via on the at least a speaker of the second user device, within the communication session.

8. A method according to claim 7, wherein the communication session supports bidirectional communication between the first user device and the second user device.

9. A method according to claim 8, wherein the wide are network is the Internet.

10. A method according to claim 7, comprising synchronizing text between the first user device and the second user device, by highlighting on the second user device portions of the text being indicated on the first user device.

11. A method according to claim 7, comprising verifying that at least one of the first user device and the second user device has stored thereon a copy of the digital book.

12. A method according to claim 11, wherein verifying is performed prior to starting the communication session on the second user device.

13. A method according to claim 7, wherein the digital book is stored on only one of the first user device and the second user device prior to the communication session, and wherein upon termination of the communication session the digital book is erased from the other one of the first user device and the second user device.

14. A method according to claim 7, comprising subsequent to providing the communication signal, exchanging between the first and second user devices support data for use in determining digital books that are supported by both the first and second user devices for being read.

15. A method according to claim 14, wherein the support data relates to digital books that are stored on both the first and second user devices.

16. A method according to claim 14, wherein the support data relates to digital books that are stored on at least one of the first and second user devices.

17. A method according to claim 14, wherein the support data relates to digital books that are stored on the one of the first and second user devices that provided the communication signal.

18. A method according to claim 14, wherein the support data relates to digital books that are stored on the one of the first and second user devices to which the communication signal is provided.

19. A method according to claim 7, comprising
providing to a user of each of the first and second user devices, digital track data relating to a track of data other than the digital book and the audio data, the digital track data for being overlayed with at least one of the digital book and the audio data; and,
overlaying the digital track data on at least one of the digital book and the audio data on each of the first user device and the second user device.

20. A method according to claim 19 comprising: verifying that at least one of the first user device and the second user device has stored thereon a copy of the digital track data.

* * * * *